W. E. KINNEY.
HEDGE TRIMMING MACHINE.
APPLICATION FILED APR. 17, 1917.
1,293,800.
Patented Feb. 11, 1919.
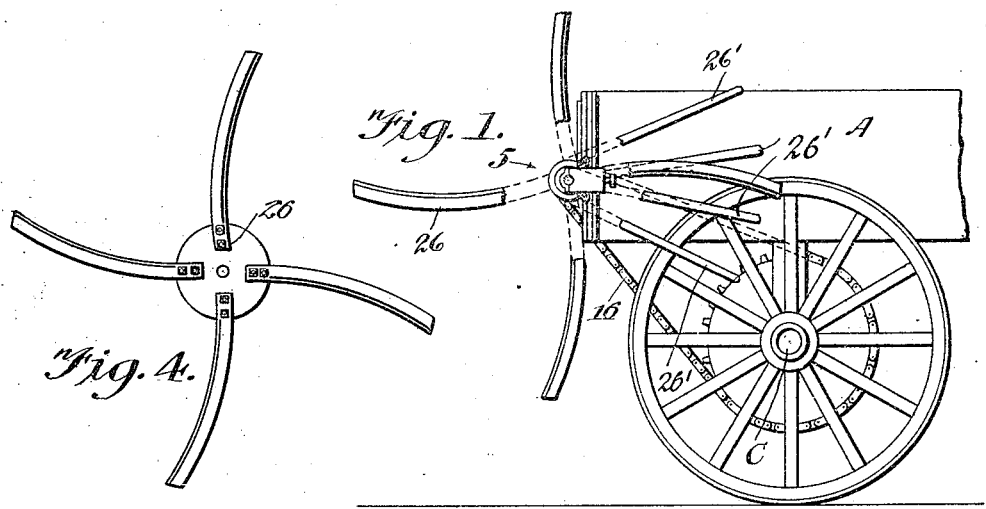
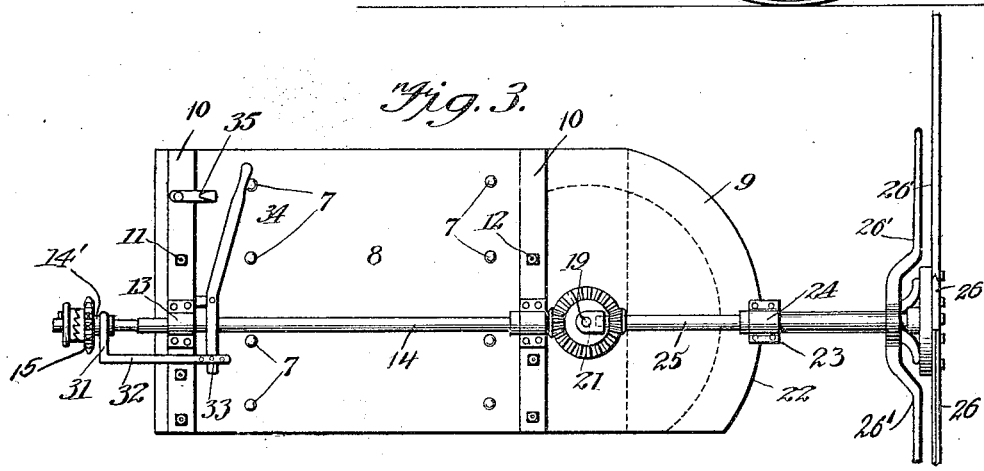
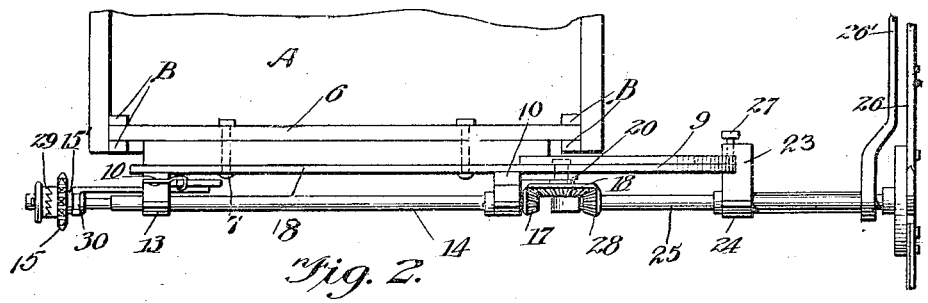
WITNESSES
R. E. Rousseau.
INVENTOR
William E. Kinney.
BY Victor J. Evans.
ATTORNEY

UNITED STATES PATENT OFFICE.

WILLIAM E. KINNEY, OF SHELBY, NEBRASKA.

HEDGE-TRIMMING MACHINE.

1,293,800.　　　　Specification of Letters Patent.　　Patented Feb. 11, 1919.

Application filed April 17, 1917. Serial No. 162,650.

*To all whom it may concern:*

Be it known that I, WILLIAM E. KINNEY, a citizen of the United States, residing at Shelby, in the county of Polk and State of Nebraska, have invented new and useful Improvements in Hedge-Trimming Machines, of which the following is a specification.

The present invention relates to hedge trimming machines.

The primary object of the invention resides in the provision of a machine of the above stated character wherein the operating mechanism for the cutter head is suitably installed upon a support adapted to be inserted in the rear open end of a wheeled vehicle, consequently providing a novel means for associating the hedge trimmer with a wheeled frame or vehicle in a simple, efficient and expeditious manner.

Furthermore, I aim to provide an adjustable bearing in which the shaft of the cutter head is supported to permit the shaft to be adjusted at various angles to facilitate the proper positioning of the cutter head with respect to the angle of the hedge to be trimmed.

With the above and other objects in view, the invention consists in the novel features, details of construction and combination of parts which will hereinafter be more fully set forth, illustrated in the accompanying drawing and pointed out in the appended claims.

Figure 1 is a side elevation illustrating the hedge trimmer connected with a wheeled frame; parts being shown in dotted lines in order to expose a shiftable bearing.

Fig. 2 is a top plan view of the trimmer;

Fig. 3 is a plan view thereof; and

Fig. 4 is a plan view of the rotatable cutter head.

Referring more particularly to the accompanying drawing, in which like characters of reference refer to corresponding parts in the several views, and in order that a clear understanding of the invention may be had, I have illustrated the hedge trimmer denoted generally by the character 5, as installed for use on a wheeled frame A. This hedge trimmer 5 embodies a heavy reinforced end gate 6 adapted to be inserted in the guides B of the wheeled frame, and serving to close the rear end of said frame. Secured to the outer or exterior face of the end gate 6 through the employment of bolts or the like fastening devices 7, is a substantially rectangular frame 8 of a length greater than the length of the end gate 6 to provide one end of the frame with an extension plate 9, which when the hedge trimmer is installed for use, projects laterally beyond one side of the wheeled frame and at right angles thereto. 10 indicates a pair of cleats arranged in spaced vertical relation to one another, and secures at points adjacent the opposite ends of the frame 8 by means of screws or the like fastening devices, designated by the characters 11 and 12 respectively. Arranged on the outer face of the frame 8 and in spaced longitudinal alinement one to the other, is a pair of stationary bearings 13 in which is journaled for rotary movement a drive shaft 14 having mounted thereon a sleeve 14', and also a drive wheel 15 in the form of a sprocket, the latter serving to operate the drive shaft 14 through its connection with the drive axle C of the wheeled frame A by a suitable chain connection, denoted by the character 16. The drive shaft 14 is positioned longitudinally of the frame and carries on its innermost end a pinion 17 which meshes with the beveled gear 18 loosely mounted on the shaft 19. The shaft 19 passes through the extension plate 9 of the frame and through the bearing 20 formed integral with the cleat 12. Pivotally connected on the outermost end of this shaft 19 is a socket 21, while connected on the curved marginal edge 22 of the extension plate through the medium of a clamp 23, is an adjustable bearing 24. The driven shaft 25 carrying at its outermost end the rotatable cutter head 26 is journaled in the socket 21 and the adjustable bearing 24. Consequently by the manipulation of the screw 27 of the clamp, the adjustable bearing may be swung on the arc of a circle, the socket 21 serving as a fulcrum point therefor, to position the driven shaft 25 at different angles. In order to advantageously perform the operation of cutting the twigs or the like material, use is made of stationary guard bars 26', consequently the twigs having a tendency to bend between the blades of the rotatable cutter 26 and the stationary guard bars 26', may be readily severed. To this end, the stationary guard or finger bars are secured on the shaft adjacent the rotatable cutter and inwardly thereof. The pinion 28 splined on the driven shaft 25 meshes with the beveled gear 18, whereby motion imparted to the drive shaft 14, operates the shaft 25 in a reverse direction from the direction of the travel of the wheeled vehicle. Due to the provision of the adjustable or shiftable bearing 24, hedges of various heights and grades may be advantageously cut.

Suitable mechanism is employed for stopping or starting the rotation of the cutter head 26 in the form of a clutch 29 having a grooved collar 30 formed on one end of the clutch 15' and in which the upright end 31 of the L-shaped arm 32 engages. Connected at its lower end as at 33 is a hand operated lever 34 pivotally mounted on the rectangular frame 8, which, upon the release of the same from the hook 35, will cause the sleeve 14' to slide upon the drive shaft 14 until the toothed faces of the clutch engage with one another, hence imparting movement to the shaft 14.

From the foregoing description, taken in connection with the accompanying drawing, the advantages of construction and the method of operation will be readily apparent to those skilled in the art to which the invention relates, and while I have described the principles of operation of the invention, together with the device which I now consider to be the best embodiment thereof, I desire to have it understood that the device shown is merely illustrative, and that such changes may be made when desired as are within the scope of the appended claims.

What is claimed as new, is:—

1. The combination with a propelled frame, of an auxiliary frame supported thereon, spaced fixed bearings on said frame, a drive shaft journaled in said bearings, movable bearings on said latter mentioned frame, a support for the latter mentioned bearings, a driven shaft journaled in the last named bearings, a cutter head on the driven shaft, a drive connection between the drive and driven shafts, and means for transmitting power from the propelled frame to the drive shaft for operating the cutter head.

2. The combination with a propelled frame, an auxiliary frame supported thereon, a drive shaft journaled on said auxiliary frame, a driven shaft journaled on said frame, a drive connection between the said drive and driven shafts, means for effecting the angular adjustment of said driven shaft with respect to the drive shaft, a cutter head on the driven shaft and means for transmitting power from the propelling mechanism to the drive shaft for operating the cutter head.

3. In a device of the class described, a frame, a drive shaft journaled thereon, a bearing pivoted on said frame, a movable bearing, a support for said movable bearing, a driven shaft journaled in the bearings capable of angular adjustments, a cutter head on the driven shaft, and means for propelling the drive shaft for transmitting motion to said cutter head.

4. A device of the class set forth, a support, a frame having connection with the support and provided with a lateral extension, a drive shaft journaled on the frame, a driven shaft journaled in a pivoted bearing mounted on the frame and operatively connected with the drive shaft and means journaling the drive shaft and having connection with the lateral extension of said frame for effecting the angular adjustment of the driven shaft with respect to the drive shaft, a cutter head on the free end of the latter mentioned shaft, and means for transmitting motion to the drive shaft.

5. A device of the character set forth, a frame, a bearing secured to said frame, a socket pivoted to said bearing, a movable bearing, a support for said movable bearing, a driven shaft journaled in the pivoted socket and said movable bearing, a cutter head on the driven shaft, and means for transmitting motion to the driven shaft for rotating said cutter head.

6. The combination with a propelled frame, of an auxiliary frame supported thereon and provided with a lateral extension, a drive shaft journaled on the auxiliary frame, a driven shaft journaled on the auxiliary frame, a drive connection between the said drive and driven shafts, means connecting the driven shaft with the lateral extension to permit of the adjustment of the driven shaft with respect to the drive shaft, a cutter head on the free end of the driven shaft, and means for transmitting power from the propelled frame to the drive shaft for operating the cutter head.

In testimony whereof I affix my signature.

WILLIAM E. KINNEY.

Copies of this patent may be obtained for five cents each, by addressing the "Commissioner of Patents, Washington, D. C."